(12) United States Patent
Beda, III et al.

(10) Patent No.: US 9,619,662 B1
(45) Date of Patent: *Apr. 11, 2017

(54) VIRTUAL NETWORK PAIRS

(75) Inventors: Joseph S. Beda, III, Seattle, WA (US); Cristian Petrescu-Prahova, Seattle, WA (US); Christoph Kern, Bainbridge Island, WA (US)

(73) Assignee: Google Inc., Mountain View, CA (US)

( * ) Notice: Subject to any disclaimer, the term of this patent is extended or adjusted under 35 U.S.C. 154(b) by 1209 days.

This patent is subject to a terminal disclaimer.

(21) Appl. No.: 13/348,548

(22) Filed: Jan. 11, 2012

Related U.S. Application Data

(60) Provisional application No. 61/432,550, filed on Jan. 13, 2011.

(51) Int. Cl.
*G06F 21/60* (2013.01)

(52) U.S. Cl.
CPC .................................. *G06F 21/606* (2013.01)

(58) Field of Classification Search
CPC ..... H04L 63/10; H04L 63/14; H04L 63/0807; G06F 9/455
See application file for complete search history.

(56) References Cited

U.S. PATENT DOCUMENTS

| | | | |
|---|---|---|---|
| 5,463,768 A | 10/1995 | Cuddihy et al. | |
| 5,778,444 A | 7/1998 | Langan et al. | |
| 6,009,177 A * | 12/1999 | Sudia | G06Q 20/02 380/30 |
| 6,178,482 B1 | 1/2001 | Sollars | |
| 6,598,179 B1 | 7/2003 | Chirashnya et al. | |
| 7,062,718 B2 | 6/2006 | Kodosky et al. | |
| 7,117,243 B2 | 10/2006 | Peart | |
| 7,650,331 B1 | 1/2010 | Dean et al. | |
| 7,653,833 B1 | 1/2010 | Miller et al. | |
| 7,761,573 B2 | 7/2010 | Travostino et al. | |
| 7,804,862 B1 | 9/2010 | Olson et al. | |

(Continued)

OTHER PUBLICATIONS

U.S. Appl. No. 13/010,548, Andrew Kadatch et al., Storing Data on Storage Nodes, filed Jan. 20, 2011.

(Continued)

*Primary Examiner* — Vivek Srivastava
*Assistant Examiner* — Nasim Nirjhar
(74) *Attorney, Agent, or Firm* — Fish & Richardson P.C.

(57) ABSTRACT

Methods, systems, and apparatus, including computer programs encoded on a computer storage medium, for implementing virtual network pairs between virtual machines and other devices. In one aspect, a method includes associating each of a plurality of different virtual machine network addresses with a respective host machine network address; receiving, from a sender, a request for a source virtual machine to communicate with a destination virtual machine; determining that the source virtual machine is authorized to communicate with the destination virtual machine; selecting, from the associations, a host machine network address for the destination virtual machine; generating a token based at least partly on the selected host machine network address and on a secret key of the destination virtual machine, wherein the secret key is not known by the source virtual machine; and sending the selected host machine network address and generated token to the sender.

30 Claims, 11 Drawing Sheets

(56) References Cited

U.S. PATENT DOCUMENTS

| | | | | |
|---|---|---|---|---|
| 8,146,147 | B2* | 3/2012 | Litvin | H04L 63/0263 709/225 |
| 8,612,559 | B2* | 12/2013 | Kuik | H04L 49/70 709/221 |
| 2002/0091902 | A1 | 7/2002 | Hirofuji | |
| 2004/0139368 | A1 | 7/2004 | Austen et al. | |
| 2005/0166011 | A1 | 7/2005 | Burnett et al. | |
| 2006/0161753 | A1 | 7/2006 | Aschoff et al. | |
| 2007/0118694 | A1 | 5/2007 | Watanabe et al. | |
| 2007/0199058 | A1 | 8/2007 | Baumgart et al. | |
| 2007/0239987 | A1* | 10/2007 | Hoole | H04L 63/102 713/169 |
| 2007/0271604 | A1 | 11/2007 | Webster et al. | |
| 2007/0280243 | A1 | 12/2007 | Wray et al. | |
| 2008/0086515 | A1 | 4/2008 | Bai et al. | |
| 2008/0201575 | A1* | 8/2008 | van der Rijn | H04L 9/321 713/156 |
| 2008/0205415 | A1 | 8/2008 | Morales | |
| 2008/0215796 | A1 | 9/2008 | Lam et al. | |
| 2008/0270704 | A1 | 10/2008 | He et al. | |
| 2009/0097657 | A1 | 4/2009 | Scheidt et al. | |
| 2009/0150629 | A1 | 6/2009 | Noguchi et al. | |
| 2009/0199177 | A1 | 8/2009 | Edwards et al. | |
| 2009/0222815 | A1 | 9/2009 | Dake | |
| 2009/0241108 | A1 | 9/2009 | Edwards et al. | |
| 2009/0249440 | A1 | 10/2009 | Platt et al. | |
| 2009/0300605 | A1 | 12/2009 | Edwards et al. | |
| 2010/0057913 | A1 | 3/2010 | Dehaan | |
| 2010/0071035 | A1 | 3/2010 | Budko et al. | |
| 2010/0199089 | A1 | 8/2010 | Vysogorets et al. | |
| 2010/0287548 | A1 | 11/2010 | Zhou et al. | |
| 2011/0022812 | A1 | 1/2011 | van der Linden et al. | |
| 2011/0055361 | A1 | 3/2011 | DeHaan | |
| 2011/0075674 | A1* | 3/2011 | Li | H04L 12/5695 370/401 |
| 2011/0153838 | A1 | 6/2011 | Belkine et al. | |
| 2011/0191485 | A1 | 8/2011 | Umbehocker | |
| 2011/0214176 | A1* | 9/2011 | Burch | G06F 9/455 726/15 |
| 2011/0231280 | A1 | 9/2011 | Farah | |
| 2011/0258441 | A1 | 10/2011 | Ashok et al. | |
| 2011/0296186 | A1* | 12/2011 | Wong | H04L 63/0272 713/171 |
| 2012/0089833 | A1* | 4/2012 | Jirka | G06F 21/33 713/168 |

OTHER PUBLICATIONS

U.S. Appl. No. 13/243,752, Kadatch, et al., Bandwidth Throttling of Virtual Disks, filed Sep. 23, 2011.
U.S. Appl. No. 13/287,813, Beda et al., Virtual Network Pairs, filed Nov. 2, 2011.
U.S. Appl. No. 13/186,293, Anderson et al., Virtual Network for Virtual Machine Communication and Migration, filed Jul. 19, 2011.
U.S. Appl. No. 13/245,545, Anderson et al., Virtual Network for Virtual Machine Communication and Migration, filed Sep. 26, 2011.
U.S. Appl. No. 13/247,830, Risbood, et al., High-Level Language for Specifying Configurations of Cloud-Based Deployments, filed Sep. 28, 2011.
U.S. Appl. No. 13/094,385, Shenoy et al., Providing Application Programs with Access to Secured Resources, filed Apr. 26, 2011.
U.S. Appl. No. 13/027,872, Rahul S. Kulkarni et al., Correlating Status Information Generated in a Computer Network, filed Feb. 15, 2011.
U.S. Appl. No. 13/153,971, Pankaj Risbood, et al., Automated Software Updating Based on Prior Activity, filed Jun. 6, 2011.
U.S. Appl. No. 13/295,897, Beda et al., Adjustable Virtual Network, filed Nov. 14, 2011.
U.S. Appl. No. 13/312,872, Anderson, Transparent Load-Balancing for Cloud Computing Services, filed Dec. 6, 2011.
U.S. Appl. No. 13/344,450, Beda et al., Managed Boot in a Cloud System, filed Jan. 5, 2012.
U.S. Appl. No. 13/346,547, Thornton et al., Processor Mode Locking, filed Jan. 9, 2012.
U.S. Appl. No. 13/349,063, Anderson, Network Address Translation for Virtual Machines, filed Jan. 12, 2012.
U.S. Appl. No. 13/350,398, Anderson, Network Addres Translation for Virtual Machines, filed Jan. 12, 2012.
U.S. Appl. No. 13/350,470, Petrescu-Prahova et al., Virtual Network Protocol, filed Jan. 13, 2012.
U.S. Appl. No. 13/356,365, Kern et al., Distributed Key Systems for Virtual Machines, filed Jan. 23, 2012.
U.S. Appl. No. 13/361,876, Beda et al., Advertising Auction System, filed Jan. 30, 2012.
U.S. Appl. No. 13/398,715, Berreth et al., Secure Inter-Process Communication, filed Feb. 17, 2012.
U.S. Appl. No. 13/402,975, Beda et al., Virtual Machine Service Access, filed Feb. 23, 2012.
U.S. Appl. No. 13/421,124, Risbood et al., Selection of Ranked Configurations, filed Mar. 15, 2012.
U.S. Appl. No. 13/418,951, Risbood et al., Virtual Machine Name Resolution, filed Mar. 13, 2012.
U.S. Appl. No. 13/422,575, Sahasranaman, Monitoring and Automatically Managing Applications, filed Mar. 16, 2012.
U.S. Appl. No. 13/424,013, Beda, Exposing Data to Virtual Machines, filed Mar. 19, 2012.
U.S. Appl. No. 13/439,256, Beda, Distribution of Cryptographic Host Keys in a Cloud Computing Environment, filed Apr. 4, 2012.
U.S. Appl. No. 13/483,880, Northrup, Defensive Techniques to Increase Computer Security, filed May 30, 2012.
Moller, Jan, et al., "Internal Network Security", Feb. 1, 2000-May 18, 2001, Retrieved from the Internet: <URL: http://www.daimi.au.dk/~fwiffo/thesis/>, 183 pages.
Primet, Pascale, et al.., "HIPCAL: State of the Art of OS and Network virtualization solutions for Grids", Sep. 14, 2007, 38 pages.
Wikipedia, "IPSec", [online] [retrieved on Jan. 4, 2011]. Retrieved from the Internet: <URL: http://en.wikipedia.org/wiki/IPsec/>, 8 pages.
Abdull, AlastairIrvine, et al. "Generic Routing Encapsulation", [online] [retrieved on Jan. 4, 2011). Retrieved from the Internet: <URL: http:/ / creativecommons. org/ licenses/ by-sa/ 3.0/>, 5 pages.
Farinacci et al., "RFC 2784: Generic Routing Encapsulation (GRE)", Mar. 2000, The Internet Society, 10 pages.
Kent et al., "RFC 4301: Security Architecture for the Internet Protocol", Dec. 2005, The Internet Society, 102 pages.
Wikipedia, "Domain Name System". [online] [Retrieved on Feb. 4, 2012]. Retrieved from the Internet: <URL: http://en.wikipedia.org/wiki/Domain_Name_System>, 16 pages.
Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.
Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.
Wikipedia. "OAuth." [online] [Retrieved on Jan. 20, 2011]. Retrieved from the Internet <URL: http://en.wikipedia.org/wiki/OAuth> , 3 pages.
Gowalla. "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.

(56) References Cited

OTHER PUBLICATIONS

MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling-Getting Started Guide—API Version Aug. 1, 2010. Amazon Web Services LLC, 2010, 20 pages.
Amazon Auto Scaling—Developer Guide—API Version Aug. 1, 2010. Amazon Web Services LLC, 2011, 62 pages.
Amazon CloudWatch—Developer Guide—API Version Aug. 1, 2010. Amazon Web Services LLC, 2010, 75 pages.
Benincosa. "Ganglia and Nagios, Part 2: Monitor enterprise clusters with Nagios—Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.
Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
How to: Getting Started With Amazon EC2, Paul Stamatiou, Apr. 5, 2008. Retrieved from the Internet: <URL:http//paulstamatiou.com/how-to-getting-started-with-amazon-ec2>, 25 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.
Managing Amazon EC2-SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.
Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.
L. Gommans, et al., Token-Based Authorization of Connection Oriented Network Resources, 1st International Workshop on Networks for Grid Applications (GridNets 2004), Oct. 29, 2004; 8 pages.
"IPsec". Creativecommons.org [online]. Creative Commons Attribution-Share Alike 3.0 Unported. [retrieved on Jan. 14, 2011]. Retrieved from the Internet: <URL: http://creativecommons.org/licenses/by-sa/3.0/ >, pp. 1-8.
"Generic Routing Encapsulation". Creativecommons.org [online]. Creative Commons Attribution-Share Alike 3.0 Unported. [retrieved on Jan. 14, 2011]. Retrieved from the Internet: <URL: http://creativecommons.org/licenses/by-sa/3.0/ >, pp. 1-5.

\* cited by examiner

VIRTUAL NETWORK PAIRS

CROSS-REFERENCE TO RELATED APPLICATIONS

This application claims the benefit of priority Under 35 U.S.C. §119(e) of U.S. Provisional Application Ser. No. 61/432,550, filed on Jan. 13, 2011, entitled "Virtual Network Pairs," which is incorporated by reference herein in its entirety.

BACKGROUND

This specification relates to providing virtual communication networks.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines.

SUMMARY

This specification describes technologies relating to virtual network pairs.

In general, one innovative aspect of the subject matter described in this specification can be embodied in methods that include the actions of associating each virtual machine network address of a plurality of different virtual machine network addresses with a respective one of a plurality of different host machine network addresses, wherein each virtual machine network address corresponds to a respective virtual machine, and wherein the host machine network address associated with the virtual machine network address is a network address of a data processing apparatus on which the respective virtual machine executes; receiving, from a sender, a request for a source virtual machine to communicate with a destination virtual machine, wherein the source and destination virtual machines are each a hardware virtualization of a data processing apparatus; determining that the source virtual machine is authorized to communicate with the destination virtual machine; selecting, from the associations, a host machine network address for the destination virtual machine; generating a token based at least partly on the selected host machine network address and on a secret key of the destination virtual machine, wherein the secret key is not known by the source virtual machine; and sending the selected host machine network address and generated token to the sender. Other embodiments of this aspect include corresponding systems, apparatus, and computer programs, configured to perform the actions of the methods, encoded on computer storage devices.

These and other embodiments can each optionally include one or more of the following features. The sender is a host operating system executing on an external data processing apparatus. The selected host machine network address comprises an Internet Protocol (IP) address of a data processing apparatus on which the destination virtual machine executes and a User Datagram Protocol (UDP) port for the destination virtual machine. The token is a hash-based message authentication code. The token is generated based at least in part on a network address of the source virtual machine. Sending data identifying a validity period for the selected host machine network address or the generated token to the sender. The token is generated based at least in part on the validity period. Identifying that the destination virtual machine has migrated to a second data processing apparatus. Associating the virtual machine network address of the destination virtual machine with the host machine network address of the second data processing apparatus. Sending a message to the sender invalidating the previously sent host machine network address.

Particular embodiments of the subject matter described in this specification can be implemented so as to realize one or more of the following advantages. A network protocol for implementing virtual network pairs is described in which message encapsulation can be performed in a user process space of an operating system that does not require elevated privileges of the kernel process space of the operating system. This affords easy development and deployment of the protocol since an operating system kernel does not need to be rebuilt each time the protocol changes. An additional benefit of having the protocol implemented in the user process space is that certain classes of security vulnerabilities, such as kernel-level buffer overflows, are mitigated or rendered more difficult to exploit by an attacker because messages are encapsulated before being provided to the kernel. The encapsulation protocol can be fast since, in some implementations, there is no encryption of the message payload required. Since authentication credentials are embedded in messages, rather than in physical layer headers, the protocol has the ability to distinguish between multiple virtual network pairs per virtual machine. That is, the protocol enables a given virtual machine to communicate with one or more other virtual machines on the same or different host machine. The protocol provides protection from packet spoofing, i.e., counterfeit packets. Another advantage of the protocol is that network traffic between two virtual machines can be prevented unless explicitly authorized. Yet another advantage is that large numbers of virtual network pairs can be established independent of the limitations of networking hardware. Additionally, no specialized support from a physical network is required for establishing the virtual network pairs. Further, traffic intended for migrated virtual machines can be redirected effectively. Another advantage is that network traffic can be transmitted between virtual machines without passing through a gateway or other central piece of hardware, allowing the virtual network to span disparate geographic networks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
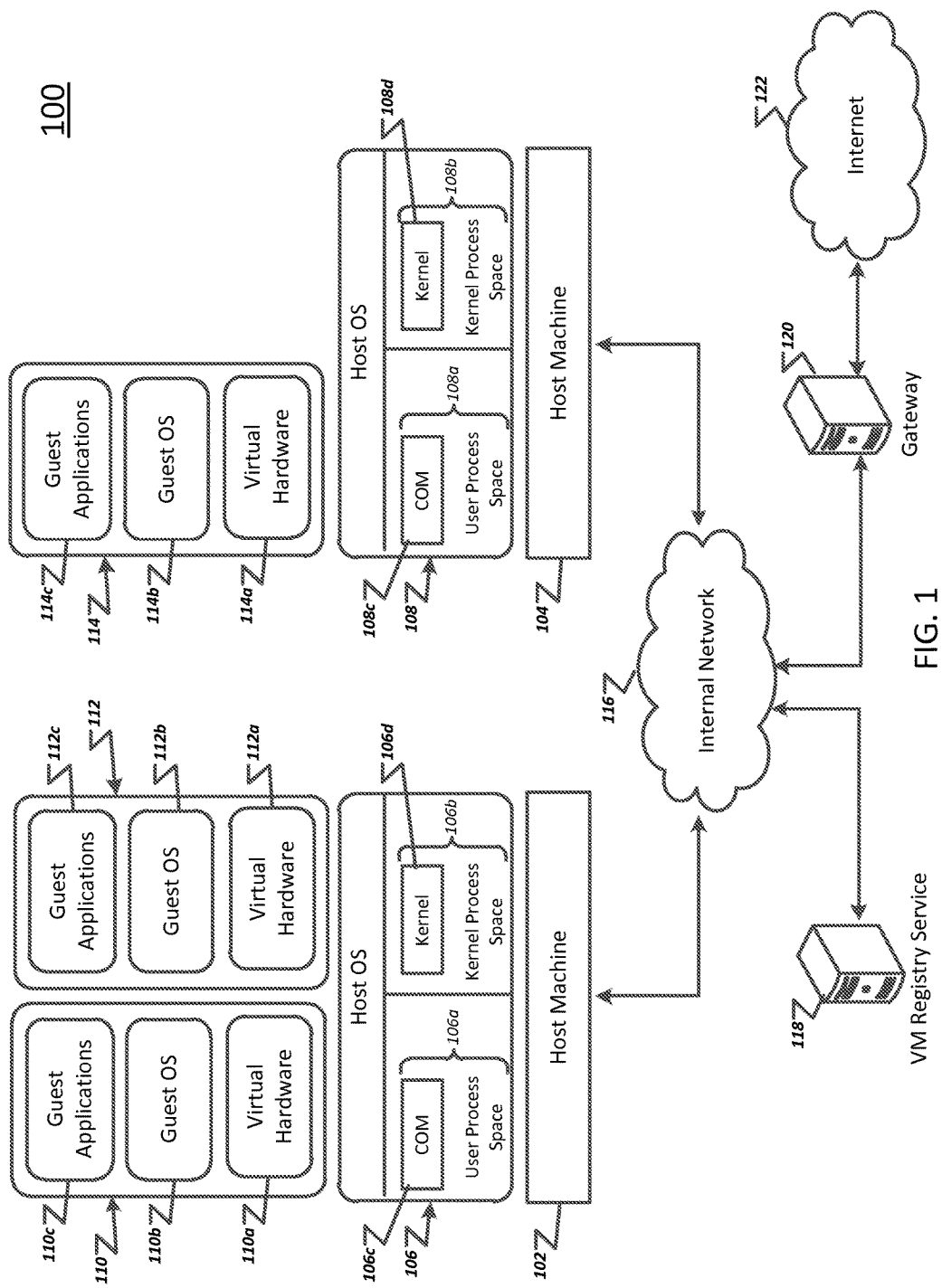
FIG. 1 is a schematic illustration of an example virtual machine system.

FIG. 1 is a schematic illustration of an example virtual machine system 100. The system 100 includes one or more host machines such as, for example, host machine 102 and host machine 104. Generally speaking, a host machine is one or more data processing apparatus such as a rack mounted servers or other computing devices. The data processing apparatus can be in different physical locations and can have different capabilities and computer architectures. Host machines can communicate with each other through an internal data communication network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatus responsible for routing data communication traffic between the internal network 116 and the external network 122. Other types of external networks are possible.

Each host machine executes a host operating system or other software that virtualizes the underlying host machine hardware and manages concurrent execution of one or more virtual machines. For example, the host operating system 106 is managing virtual machine (VM) 110 and VM 112, while host OS 108 is managing a single VM 114. Each VM includes a simulated version of the underlying host machine hardware, or a different computer architecture. The simulated version of the hardware is referred to as virtual hardware (e.g., virtual hardware 110a, 112a and 114a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers. Other address schemes are possible.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c). In some implementations, the communication process executes in the user process space (e.g., user process space 106a) of a host operating system (e.g., host operating system 106). In other implementations, the communication process can execute in the kernel process space (e.g., kernel process space 106d) of the host operating system. There can be a single communication process for all VMs executing on a host machine or multiple communication processes, e.g., one for each VM executing on the host machine. In yet further implementations, some portion of the communication process executes in the user process space and another portion executes in the kernel process space. The communication process communicates with a registry service (e.g., VM registry service 118) in order to establish a virtual network pair (VNP) between two VMs. A virtual network pair (VNP) is a logical computer network that is implemented on top of one or more physical (wired or wireless) computer networks. A VNP routes traffic between two endpoints using one or more virtual connections or links. By way of illustration, a VNP between virtual machine 110 and virtual machine 114 would route packets sent between VNP endpoints managed respectively by communication processes 106c and 108c over internal network 116. The VM registry service 118 is one or more data processing apparatus that execute software for keeping track of assignments of network addresses (e.g., IP addresses) to VMs, and for keeping track of network addresses (e.g., IP addresses) of host machines that the VMs are executing on. The data processing apparatus can be in different locations and can have different capabilities and computer architectures.

Figure 2:
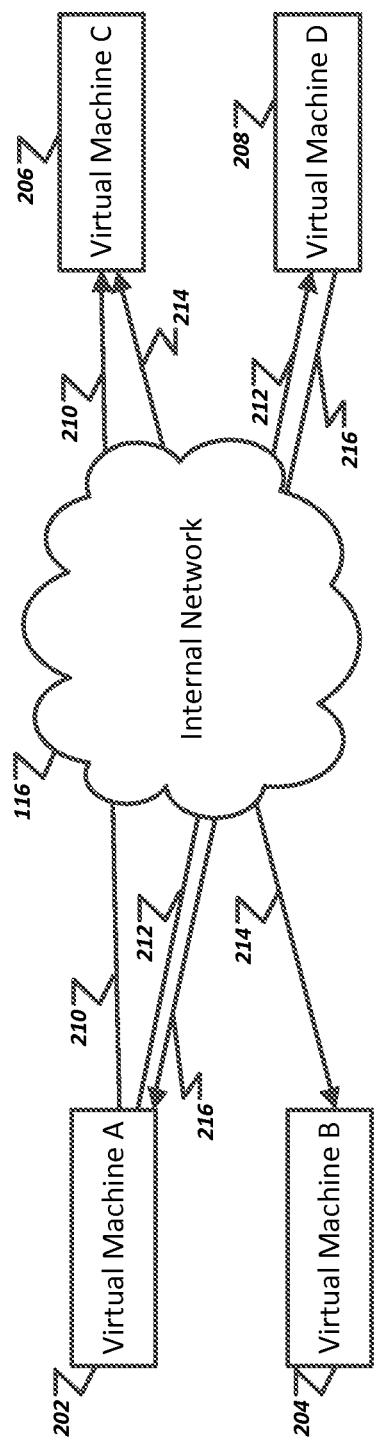
FIG. 2 is a diagram illustrating the establishment of multiple virtual network pairs between multiple virtual machines.

FIG. 2 is a diagram illustrating the establishment of multiple virtual network pairs between multiple virtual machines. VM A 202, VM B 204, VM C 206, and VM D 208 can execute on multiple separate data processing apparatus. Alternatively, some or all of VM A 202, VM B 204, VM C 206, and VM D 208 can execute on the same data processing apparatus. As illustrated in FIG. 2, a VNP 210 has been established allowing VM A 202 to send packets to VM C 206 over internal network 116. However, the VNP 210 is unidirectional, and VM C 206 cannot send packets to VM A 202 over the VNP 210-VM C 206 would need to establish a unidirectional VNP between itself and VM A 202 in order to do so. The establishment of VNPs is described in more detail below in conjunction with FIG. 3. Multiple VNPs can be established for a particular VM, one for each destination VM that is to receive packets from the particular VM. For example, a VNP 212 has been established allowing VM A 202 to send packets to VM D 208. Unlike VNP 210, VNP 212 has a corresponding VNP 216 which allows VM D 208 to send packets to VM A 202. Additionally, a VNP 214 has been established between VM B 204 and VM C 206 that allows VM B 204 to send packets to VM C 206 and VM C 206 to send packets to VM B 204. Each of VNP 210, VNP 212, and VNP 214 can have a separate validity period, after the expiration of which no more packets can be received using the VNP, and a new VNP must be established if a source VM is to send packets to a destination VM. As will be described below, each VNP can be established so that a source VM cannot send packets to a destination VM unless explicitly authorized by a VM registry service (e.g., VM registry service 118).

Figure 3:
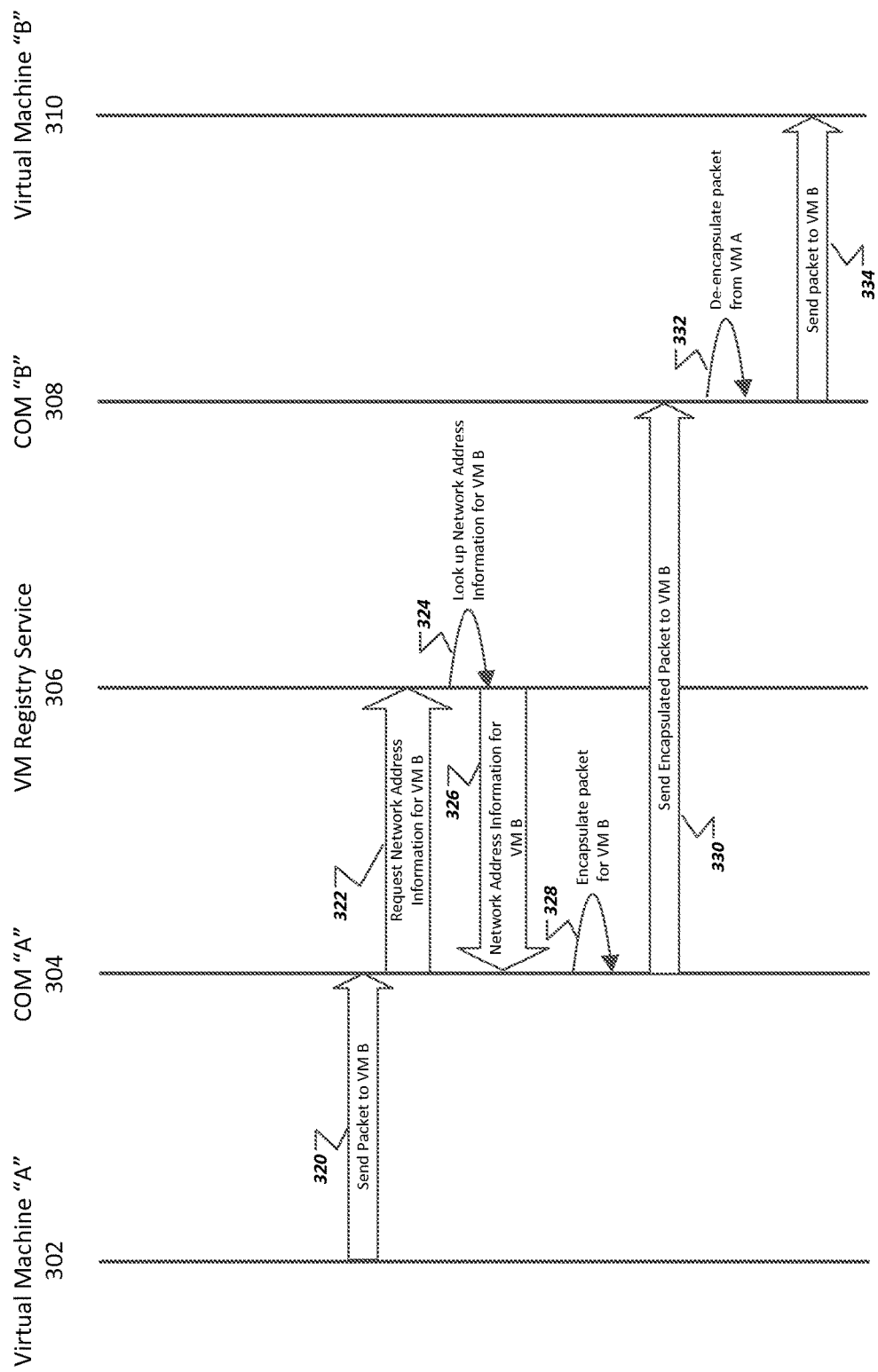
FIG. 3 is a diagram illustrating example message sending between virtual machines.

FIG. 3 is a diagram illustrating example message sending between virtual machines. Before an initial packet from one VM to another is transmitted, a VNP between the two VMs is established. In various implementations, the communication process on a given host machine is responsible for establishing VNPs. For example, communication process 106c is responsible for establishing VNPs for VM 110 and VM 112. Likewise, communication process 108c can do the same for VM 114. Each VM can communicate with one or more other VMs using a separate VNP for each. Therefore, a particular communication process can establish multiple VNPs for a particular VM managed by a host operating system, e.g., a unique VNP can be established between the particular VM and each other VM that the particular VM wants to send packets to. Additionally, because each VNP is unidirectional, a VM A may be allowed to send packets to a VM B, but VM B may not be allowed to send packets to VM A.

Referring to FIG. 3 and by way of example, VM A 302 attempts to transmit a packet 320 to VM B 310, which is identified by a network address (e.g., an IP or media access control address). The network address of VM B 310 is distinct from the network address of the host machine on which VM B 310 is executing. In some implementations, the packet is an IP version 4 or version 6 packet. In other implementations, the packet is an Open Systems Interconnection Reference Model layer 3 or higher protocol packet, such as, for example, UDP, Transmission Control Protocol (TCP), and so on. Other types of packets, such as Ethernet packets, are possible.

The packet is intercepted by the communication process 304 of the host operating system on which VM A 302 is executing. The communication process 304 cannot transmit the intercepted packet to VM B 310 without knowing at least the network address of the host machine, which is not known by VM A 302. The communication process 304 determines that a VNP between VM A 302 and VM B 310 has not yet been established by, for example, determining that the network address of the host machine on which VM B 310 is executing is not already stored in a cache accessible by the communication process 304. This being the case, the communication process 304 requests the network address information that is required to enable VM A 302 to send packets to VM B 310 from the VM registry service 306. In some implementations, the required network address information includes the IP address of the host machine of VM B 310 and a UDP port number on the host machine that has been reserved for receiving traffic directed to VM B 310.

By way of illustration, the communication process 304 on VM A 302's host machine sends a request 322 for the required network address information to the VM registry service 306. In response, the VM registry service 306 looks up the IP address of the host machine of VM B 310 and a UDP port number that is reserved for receiving traffic directed to VM B 310 on the host machine. The VM registry service 306 can also look up or determine a validity period for the network address information. In some implementations, the validity period is the current time plus a time-to-live (TTL). The TTL can be on the order of minutes (e.g., 10 minutes) or other granularities. In some implementations, the validity period is set to a value (e.g., −1) to indicate that the network address information never expires.

In some implementations, the VM registry service 306 determines if VM A 302 should be allowed to communicate with VM B 310 by, for example, consulting a traffic policy. If VM A 302 is not allowed to communicate with VM B 310, the VM registry service 306 denies the request.

The VM registry service 306 returns a tuple including the IP address of the host machine of VM B 310, the UDP port number that is allocated to VM B 310, and the validity period for the network address information to the communication process 304. Once the communication process 304 receives the tuple, the packet 320 can be encapsulated and transmitted to VM B's host machine using the IP address of the host machine of VM B 310 and the UDP port number that is allocated to VM B 310 as the destination address of the packet.

The communication process 304 can store information for each VNP established for virtual machines executing on the host machine of the communications process 304, e.g., the validity period of each VNP and the network address information corresponding to each VNP, in a cache or other data store accessible to the communication process 304. After the communication process 304 determines that a validity period for a particular VNP has expired, the communication process 304 can delete or otherwise invalidate the network address information corresponding to the particular VNP. When a VNP requires an authentication token, as will be described in more detail in conjunction with FIG. 4 below, the authentication token can also be stored in the cache. In some implementations, the communication process 304 can maintain a table that identifies each VNP and associates the VNP with its corresponding network address information, validity period, and, optionally, its authentication token.

When the communication process 304 receives a subsequent request from VM A 302 to send a packet to VM B, the communication process 304 can determine whether the validity period has passed. If the validity period has not yet passed, the communication process 304 can reuse the network address information. If the validity period has passed, a new tuple can be obtained from the VM registry service 306, for example, as described above.

The encapsulated packet is then sent 330 to the destination host machine for VM B 310 where it is intercepted by the communication process 308 (or by another process). The communication process 308 de-encapsulates the received message 332 and then delivers the original packet to the VM B 310. This can be done by injecting the IP packet into the network stack as an Ethernet frame, for example.

Figure 4:
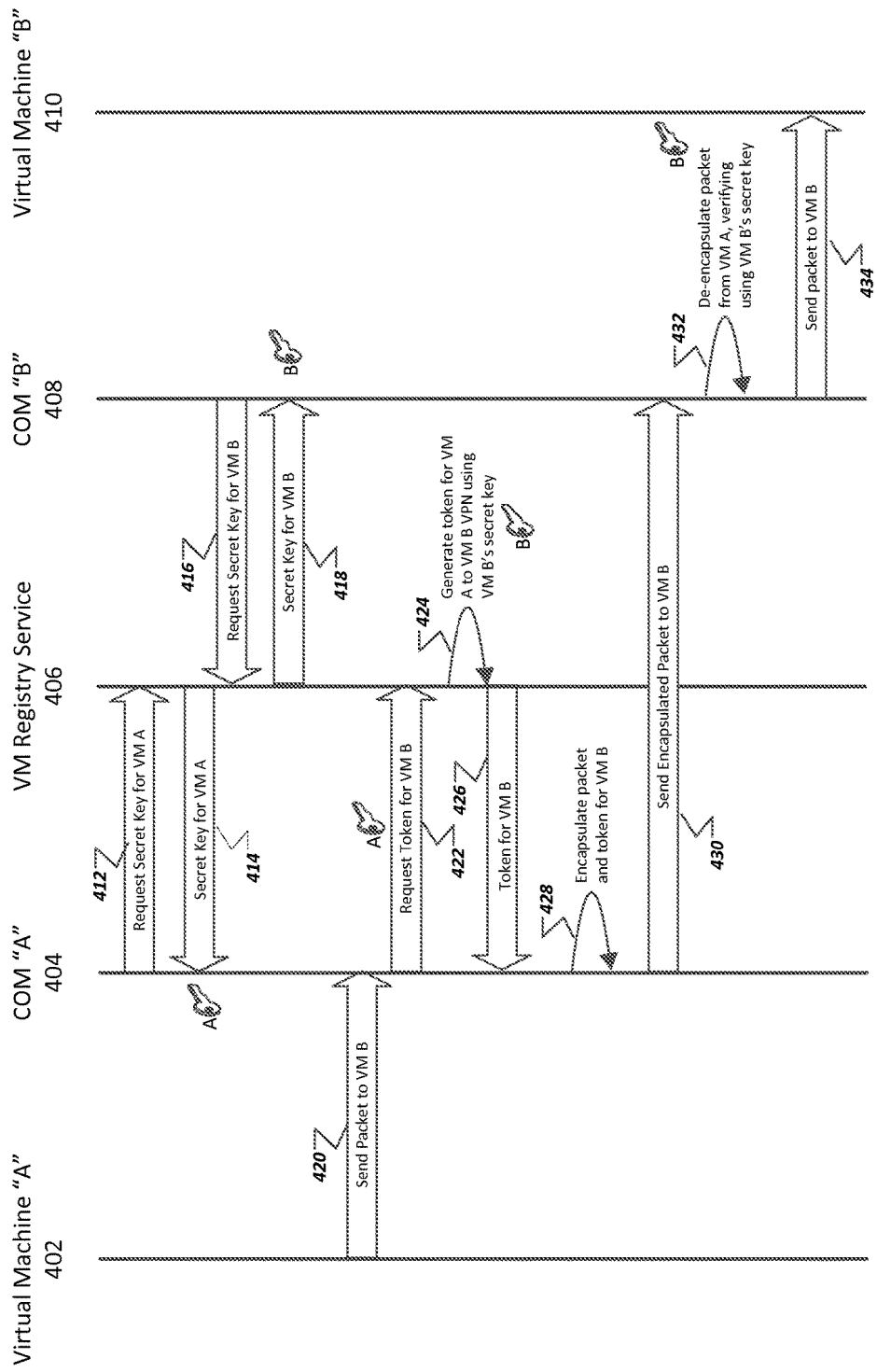
FIG. 4 is a diagram illustrating example message sending including token negotiation.

FIG. 4 is a diagram illustrating example message sending including token negotiation. In some implementations, before a VM can send packets to or receive packets from other VMs, the VM (or a communication process executing on the VM's host machine) needs to obtain a secret key. A secret key is a piece of information that serves to uniquely identify a VM among all VMs connected through their respective host machines to the internal network 116, for example. The secret key can be a number, a string of characters, other data, combinations of these, or any other string of bits of sufficient entropy. The secret key can be generated in such a way that an entity with no prior knowledge of the key has no computationally feasible way of deriving the key. The secret key can be generated using, for example, a cryptographically secure pseudorandom number generator.

In some implementations, the secret key is assigned to a VM by the VM registry service 118. Secret keys can also be assigned by another process besides the VM registry service. A given VM may not know what its secret key is and does not know the secret key of other VMs. In some implementations, the VM does not need to know what its secret key is. In some implementations, the communication process (e.g., communication process 106c) on a given host machine (e.g., host machine 102) keeps track of the secret keys for VMs managed by the host operating system (e.g. host operating system 106).

By way of illustration, the communication process 404 on VM A 402's host machine can request a secret key for VM A 402 from the VM registry service 406 by sending a message 412 to the VM registry service 406. The request for the secret key can be sent via secure protocol that allows the VM registry service 406 to authenticate which communication process it is communicating with. Other communications between the VM registry service and communication process 404 or other communication processes can also be made using the same secure protocol.

The VM registry service 406 responds to the communication process 404 with a message 414 containing the secret key for VM A. As a further example, the communication process 408 on VM B 410's host machine can request a secret key for VM B 410 from the VM registry service 406 by sending a message 416 to the VM registry service 406. The VM registry service 406 responds to the communication process 408 with a message 418 containing the secret key for VM B. Alternatively, the secret key for a particular VM can be assigned automatically, e.g., without a request for a secret key being sent, when a VM is first instantiated by the VM registry service 406 or a separate process.

As described above, before an initial packet from one VM to another is transmitted, a VNP between the two VMs is established. When secret keys are required for sending or receiving messages, the communication process on a given host machine obtains a security token for the VNP as part of establishing the VNP. Referring again to FIG. 4 and by way of example, VM A 402 attempts to transmit a packet 420 to VM B 410. The packet is intercepted by the communication process 404 of the host operating system on which VM A 402 is executing. The communication process 420 determines that a VNP between VM A 402 and VM B 410 has not yet been established or that a validity period for a previously-established VNP between VM A 402 and VM B 410 has expired. For example, the communication process 420 can determine that a VNP between VM A 402 and VM B 410 has not yet been established by verifying that one or more of network address information and a security token for the desired VNP are not stored in a cache accessible by the communication process 420. This being the case, the communication process 404 requests the network address information and the security token that are required for VM A 402 to communicate with VM B 410 from the VM registry service 406. A token is required in order to establish a unidirectional VNP from a source VM to a destination VM. As will be evident from the below description, the token used by VM A to communicate with VM B is not the same as the token that would be required for VM B 410 to communicate with VM A 402. The token request 422 can contain, for example, the secret key for VM A and a network address (e.g., IP address) of the destination VM B 410.

In response to the request 422, the VM registry service 406 uses the secret key S_a of VM A 402 to look up or determine the following attributes of VM A 402:

IP_VM_a, the IP address assigned to VM A;

Phys_Port_a, the UDP port assigned to VM A on VM A's host machine; and

Phys_IP_a, the IP address of VM A's host machine.

Alternatively, the above attributes of VM A 402 can be included in the request, e.g., in the header of a message, or looked up based on other information included in the request. The VM registry service 406 also looks up or determines expiry_a_b, the validity period of the token and the network address information. As discussed above, the validity period can be the current time plus a time-to-live (TTL). In some implementations, expiry_a_b is set to a value (e.g., −1) to indicate that the token never expires. Alternatively the token and the network address information can have different validity periods. In some implementations, the address of the host machine can be represented using a remote direct memory access address (RDMA) or a distinct separate IP address for each hosted VM. In some implementations, the virtual address associated with the VM can include an Ethernet (layer 2) virtual hardware address or other layer 3 address.

In some implementations, the VM registry service 406 verifies that the request 422 was actually transmitted from Phys_IP_a and otherwise denies the request. In further implementations, the VM registry service 406 can consult a traffic policy to determine if VM A 402 should be allowed to communicated with VM B 410 and, if not, denies the request.

In various implementations, the VM registry service 406 computes a token T_a_b for traffic from VM A 402 to VM B 410 as follows (FIG. 4 at 424):

$$T\_a\_b = \text{TruncMAC}(S\_b, \text{Phys\_IP\_a} | \text{Phys\_IP\_b} | \text{Phys\_Port\_a} | \text{Phys\_Port\_b} | \text{IP\_VM\_a} | \text{IP\_VM\_b} | \text{expiry\_a\_b})$$

where '|' denotes concatenation, S_b is VM B 310's secret key, and TruncMAC is a Message Authentication Code (MAC) function (e.g., HMAC-SHA1, or TBD) that has been truncated, for example, to 64 bits. Other MAC functions are possible. In some implementations, all of the fields being concatenated are a fixed size, i.e., the concatenation is uniquely determined without the need for separators. Although the fields are concatenated in a certain order, other field orderings are possible.

The VM registry service 406 returns the tuple (Phys_IP_b, Phys_Port_b, T_a_b, expiry_a_b) to communication process 404 in a response 426 to the request 422, where Phys_IP_b is the IP address of the host machine on which VM B 410 is executing and Phys_Port_b is the UDP port on VM B's host machine that has been reserved for receiving traffic directed to VM B 410. Once the communication process 404 receives the tuple, the packet 420 can be encapsulated and transmitted to VM B's host machine using the Phys_IP_b and Phys_Port_b as the destination address of the packet. Future packets destined for VM B 410 can reuse the tuple information until expiry_a_b has passed. Once the expiry_a_b has passed (if it is not set to a value indicating that the token never expires), a new token can be obtained as described above, for example. In order for VM B 410 to send a packet to VM A 402, a token and the network address information of VM A are needed to establish a unidirectional VNP from VM B 410 to VM A 402. The same process can be followed as outlined above or, alternatively, a packet sent from VM A to VM B can include the token and the required network address information. This alternative is described further below.

The encapsulated packet is then sent 430 to the destination host machine for VM B 410 where it is intercepted by the communication process 408 (or by another process). The communication process 408 de-encapsulates the received message and validates the token (FIG. 4 at 432) and then delivers the original packet to the VM B 410.

Figure 5:
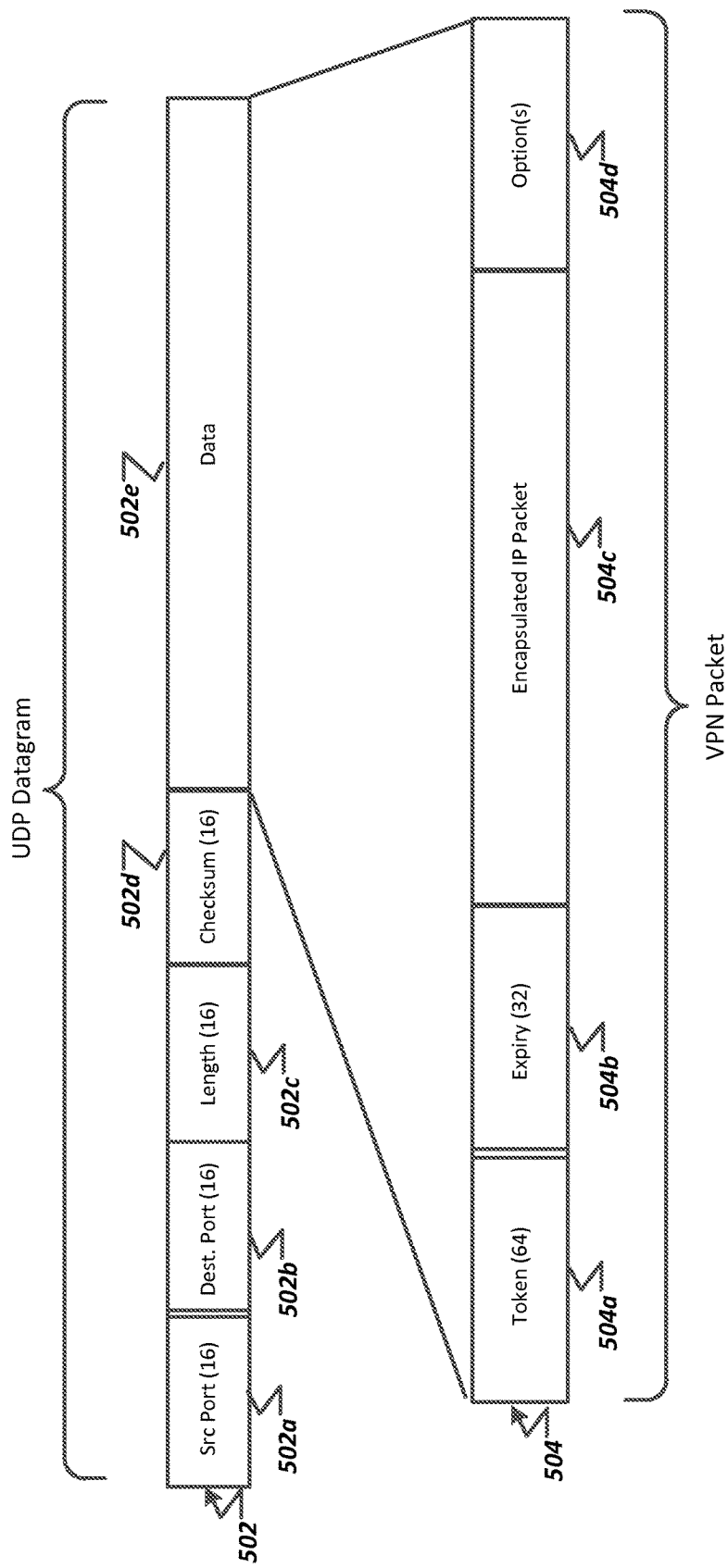
FIG. 5 is a diagram of an example encapsulation packet.

FIG. 5 is a diagram of an example encapsulated packet. Outgoing packets (e.g., outgoing packet 420 of FIG. 4 or outgoing packet 320 of FIG. 3) such as IPv4 and IPv6 packets are encapsulated by the communication process, or another process. Encapsulation of an outgoing packet takes place before packet transmittal. In some implementations, the encapsulation packet is a UDP datagram. Other types of encapsulation packets are possible. By way of illustration, an outgoing packet is encapsulated in the data portion 502e of a UDP packet 502 as shown in FIG. 5. The UDP packet 502 has a header consisting of a source port number 502a (16 bits), a destination port number 502b (16 bits), a length field 502c (16 bits) which is the length of the data portion 502e, and a checksum 502d (16 bits). In various implementations, the source port 502a is set to Phys_Port_a and the destination port 502b is set to Phys_Port_b. The data portion 502e is variable length and contains the outgoing packet. In some implementations, the data portion 502e can be encrypted. Symmetric or asymmetric encryption key algorithms can be used to encrypt some or all of the data portion 502e, for example. The encryption keys can be distributed by a VM registry service, e.g., VM registry service 118 of FIG. 1. In some implementations, a conventional key negotiation protocol, e.g., the Diffie-Hellman protocol, is used to encrypt the data portion 502e.

If security tokens are required for communication between VMs, the data portion 502e contains VNP packet 504 that includes the token T_a_b 504a (64 bits), the expiry time expiry_a_b 504b (32 bits), the outgoing packet 504c (variable length), and an optional options field 504d (variable length). Other lengths for the VNP packet fields are possible. In addition, the fields of the VNP packet 504 can occur in a different order than that which is illustrated in FIG. 5. As described above, the outgoing packet can be, for instance, an OSI Reference Model layer 2 or higher protocol packet. In some implementations, the outgoing packet is an IP packet. Other outgoing packet types are possible including, for example, Ethernet packets. Once encapsulation is complete, the communication process or another process on the respective host machine's operating system can transmit the UDP packet 502 in an IP packet with a source IP address of Phys_IP_a and a destination IP address of Phys_IP_b. Alternatively, the encapsulation packet can be transmitted using a different protocol.

In some implementations, the VNP packet includes an options field 504d. The options field 504d allows a sending VM to convey additional information to a receiving VM. If the encapsulation packet is a UDP packet, as illustrated in FIG. 5, the length of the options field can be calculated based on the difference of the value specified in the length 502c field and the combined size of the token 504a, expiry 504b, and encapsulated IP packet 504c fields. The size of the encapsulated IP packet 504c is available in the header of the packet 504c. The options field 504d can be omitted from the VNP packet 504 if its inclusion would push the size of the encapsulation packet (e.g., UDP packet 502) above the maximum transmission unit (MTU) which would result in packet fragmentation. In further implementations a field such as a bit flag, for example, can be added to the VNP packet 504 to indicate the presence of an options field 504d.

The options field 504d can be used to send a return VNP token T_b_a to the receiving VM in order to avoid the receiving VM having to obtain a token in order to reply to the sending VM. The communication process 404 for VM A 402 has all information on hand that is needed to compute T_b_a; in particular, the token is signed with VM A 402's secret key S_a. The return token T_b_a can likely be included in the first packet sent between VM A 402 and VM B 410 since, in the case of TCP, the first packet is a small SYN packet which leaves sufficient room for the options field 504d containing the return token without the resulting encapsulation packet exceeding MTU. The options field 504d can also be used to send various protocol extensions, to exchange encryption keys, to send control flow information, and so on.

Figure 6:
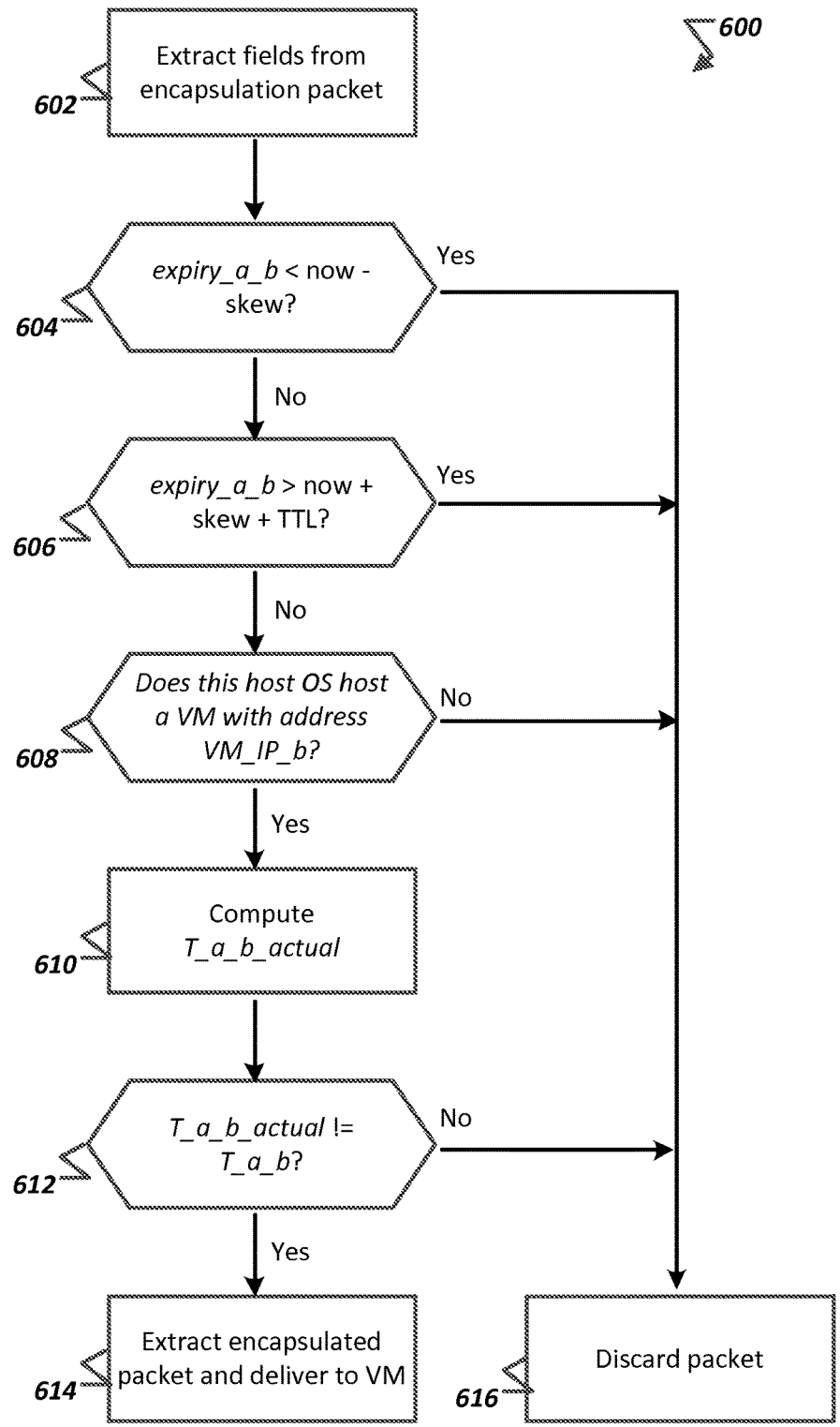
FIG. 6 is a flow diagram illustrating an example technique for packet de-encapsulation.

FIG. 6 is a flow diagram illustrating an example technique 600 for packet de-encapsulation as can be performed by the communication process 408 or another process on the destination host machine. The de-encapsulation process can be performed without the need to communicate with the VM registry service 118. With reference to FIG. 4, when an encapsulation packet is received fields from the packet are extracted in order to validate the packet (602). The source and destination IP addresses and ports of the UDP packet are extracted: Phys_IP_a, Phys_IP_b, Phys_Port_a, and Phys_Port_b. The source and destination address of the encapsulated IP datagram are also extracted: IP_VM_a, IP_VM_b. Finally, the token and expiry are extracted from the encapsulation header: T_a_b and expiry_a_b.

If expiry_a_b is less than the current time minus a skew (604), the encapsulation packet is discarded (616). In some implementations, the skew is an estimate of likely clock skew between host machine clocks (e.g., a few seconds). The skew can be set to zero if host machine clocks are synchronized. Otherwise, if expiry_a_b is greater than the current time plus skew and TTL (606), the encapsulation packet is also discarded (616). A check is performed to verify whether the host operating system is hosting a VM having the address VM_IP_b and having being allocated the UDP port Phys_Port_b (608). If not, the encapsulation packet is discarded (616). The extracted fields and VM B 410's secret key S_b are used to calculate T_a_b_actual as follows (610):

$$T\_a\_b\_actual = TruncMAC(S\_b, Phys\_IP\_a | Phys\_IP\_b | Phys\_Port\_a | Phys\_Port\_b | IP\_VM\_a | IP\_VM\_b | expiry\_a\_b).$$

T_a_b_actual is then compared to the token T_a_b from the encapsulation packet (612). If T_a_b_actual is the same as T_a_b then the encapsulated packet (e.g., encapsulated IP packet 504c) is extracted from the encapsulation packet (e.g., encapsulation packet 502) and is delivered to VM B 410 (614). Otherwise, the encapsulation packet is discarded (616).

In further implementations, and with reference to FIG. 1, the gateway 120 can serve as an encapsulation gateway to allow virtual machines on the internal network 116 to communicate with hosts on the external network 122. When the gateway 120 receives an encapsulated packet from a VM (e.g., VM 114) destined for the external network 122, the gateway 120 will validate the token of the VNP packet as described above with reference to FIG. 4, for example. If the token validation fails, the packet is discarded. If validation succeeds, the encapsulation packet is de-encapsulated and the encapsulated packet is extracted and injected into the gateway 120's network stack where it is subject to normal routing. Upon receiving a non-encapsulated packet from the external network 122 destined for a VM, the gateway 120 obtains a token (e.g., from the VM registry service 118 or from a local cache of tokens) for the destination of the packet and then encapsulates the packet as described above with reference to FIG. 4, for example. The gateway 120 then transmits the encapsulated packet to the destination VM's host machine. If a VM queries the VM registry service 118 for a token that is for a destination computer that is not on the internal network 116, the VM registry service 118 responds with a tuple (Phys_IP_b, Phys_Port_b, T_a_b, expiry_a_b) where Phys_IP_b, Phys_Port_b and T_a_b are for the gateway 120, rather than the ultimate destination, so that the VM's packets are routed through, and de-encapsulated by, the gateway 120. In some implementations, the VM can use this tuple to send packets to any destination on the external network 122 thus avoiding having to obtain a tuple from the VM registry service 118 for each unique destination.

Figure 7:
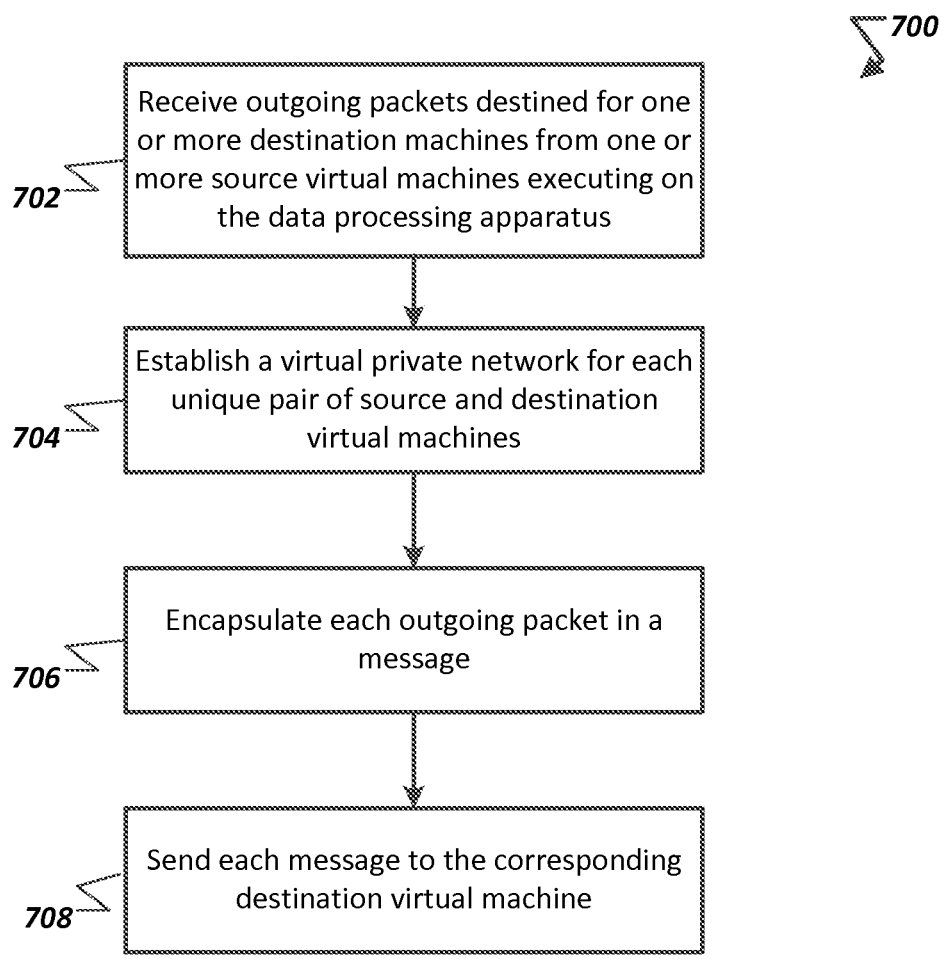
FIG. 7 is a flow diagram illustrating an example technique of message sending.

FIG. 7 is a flow diagram illustrating an example technique 700 of message sending. The technique 700 can be performed by one or more data processing apparatus. For example, a communication process (e.g., the communication process 106c of FIG. 1) can be used to perform the technique 700.

The communication process receives 702 outgoing packets destined for one or more destination machines from one or more source virtual machines executing on the data processing apparatus. Each outgoing packet is intended for a destination virtual machine, which is identified by a virtual machine network address (e.g., an IP or media access control address), and is intercepted by the communication process.

The communication process establishes 704 a virtual network pair for each unique pair of source and destination virtual machines. The communication process can establish the virtual network pair by obtaining network address information for each destination virtual machine from a VM registry service. The network address information can include, for example, the IP address of the host machine for each virtual machine and a UDP port allocated to the destination virtual machine on its host machine. In some implementations, a security token is also required to establish a virtual network pair. The security token can be based in part on the secret key of the destination virtual machine. Each established virtual network pair can be unidirectional so that, for example, a virtual machine can be allowed to send packets to a particular destination virtual machine, but the particular destination virtual machine may not be able to send packets to the source virtual machine in return.

The communication process encapsulates 706 each outgoing packet in a message and send each message 708 to the corresponding destination virtual machine. Each message can be addressed, for example, to the IP address of the host machine for the destination virtual machine and include the UDP port allocated to the destination virtual machine for the message.

Figure 8:
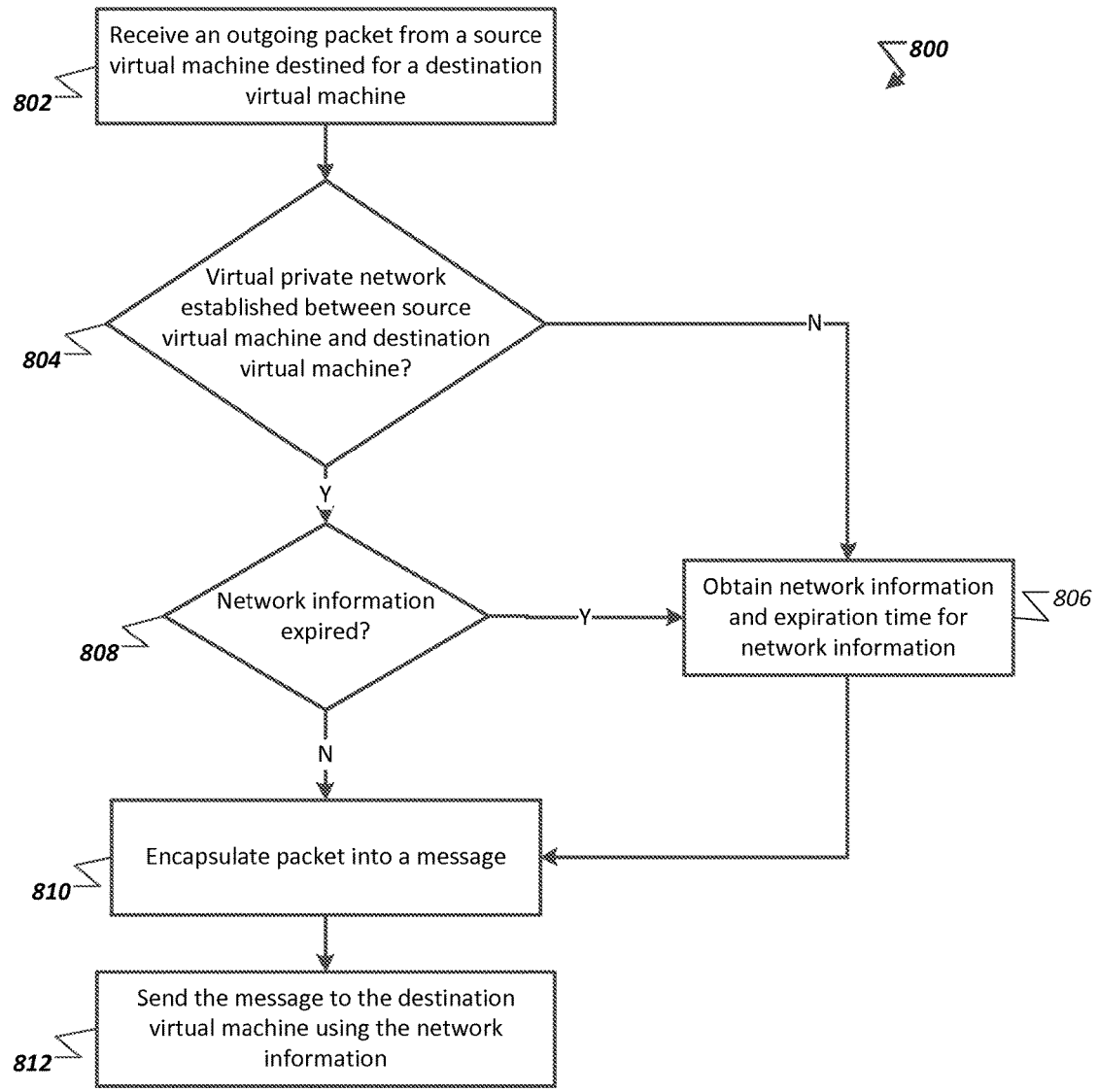
FIG. 8 is a flow diagram illustrating an example technique of establishing a virtual network pair.

FIG. 8 is a flow diagram illustrating an example technique of establishing a virtual network pair. The technique 800 can be performed by one or more data processing apparatus. For example, a communication process (e.g., the communication process 106c of FIG. 1) can be used to perform the technique 800.

The communication process receives 802 an outgoing packet from a source virtual machine destined for a destination virtual machine and determines 804 whether a virtual network pair has been established between the source virtual machine and the destination virtual machine. The communication process can, for example, determine whether the network address information for the host machine of the destination virtual machine is stored in a local cache.

If a virtual network pair has not been established, the communication process obtains 806 network information and a validity period for the network information from an external data processing apparatus. For example, the communication process can obtain the network information from a VM registry service (e.g., VM registry service 118 of FIG. 1). In some implementations, the communication process also obtains a security token for the virtual network pair from the VM registry service.

If a virtual network pair has been established between the source virtual machine and the destination virtual machine, the communication process determines 808 if the network information is expired. For example, the communication process can determine whether a validity period for the network address information for the host machine of the destination virtual machine has expired. If the network information is expired, the communication process can obtain new network information from the external data processing apparatus.

Once the network information has been obtained, the communication process encapsulates 810 the packet into a message and sends 812 the message to the destination virtual machine using the network information.

Figure 9:
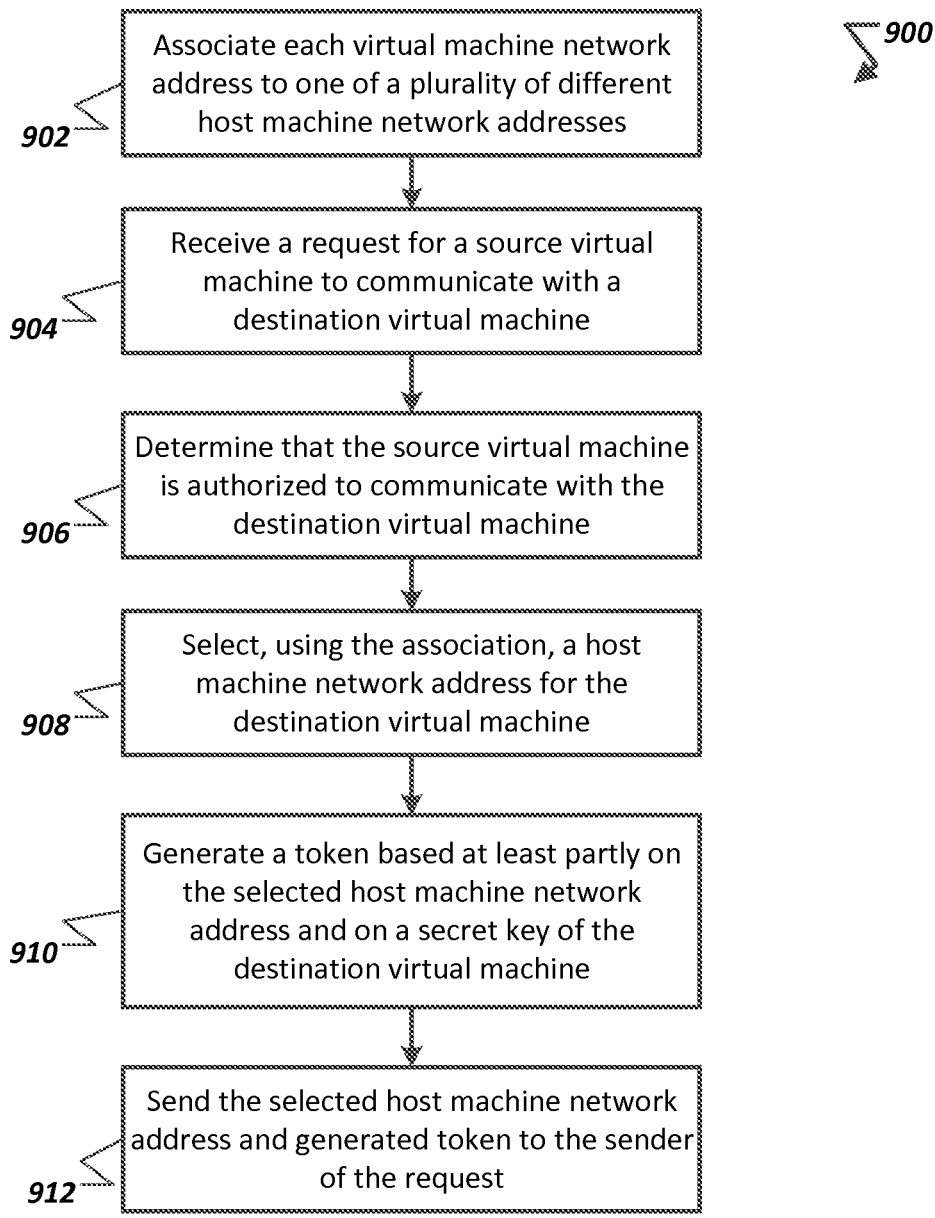
FIG. 9 is a flow diagram illustrating an example technique of determining a secret key and network address information for establishing a virtual network pair.

FIG. 9 is a flow diagram illustrating an example technique 900 of determining a secret key and network address information for establishing a virtual network pair. The technique 900 can be performed by one or more data processing apparatus. For example, a VM registry service (e.g., the VM registry service 118 of FIG. 1) can be used to perform the technique 900.

The VM registry service associates 902 each of a plurality of virtual machine network addresses to one of a plurality of different host machine network addresses. For example, the VM registry service can associate an IP address for each virtual machine with the IP address of its host machine and a UDP port allocated to the virtual machine on the host machine. The VM registry service can store the associations in a table that includes, for a particular virtual machine, the IP or media access control access for the virtual machine, the IP address of the host machine of the virtual machine, the UDP port allocated to the virtual machine on the host machine, and a secret key for the virtual machine. The table optionally includes fields for other attributes of the virtual machine (e.g., a customer identifier or a billing account number).

The VM registry service receives 904 a request for a source virtual machine to communicate with a destination virtual machine. For example, the request can be received from a communication process on the host machine of the source virtual machine.

The VM registry service determines 906 that the source virtual machine is authorized to communicate with the destination virtual machine. For example, the VM registry service can consult a traffic policy to determine that the source virtual machine is authorized to send packets to the destination virtual machine.

The VM registry service selects 908, using the association, a host machine network address for the destination virtual machine. The machine network address can include the IP address of the host machine of the destination virtual machine and the UDP port assigned to the destination virtual machine on the host machine.

The VM registry service generates 910 a token based at least partly on the selected host machine network address and on a secret key of the destination virtual machine. The token can also be based on, for example, the network address of the source virtual machine and a validity period for the selected host machine network address.

The VM registry service sends 912 the selected host machine network address and generated token to the sender of the request. For example, the VM registry service can send the network address and the generated token to the communication process for the source virtual machine, which then uses the received information to establish a virtual network pair between the source virtual machine and the destination virtual machine.

Figure 10:
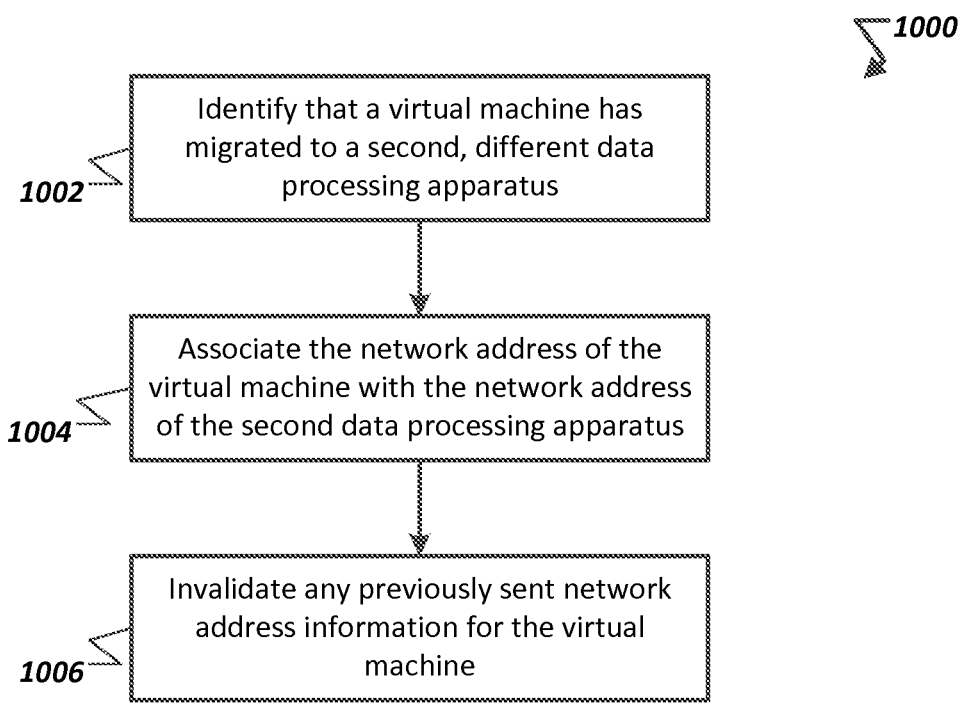
FIG. 10 is a flow diagram illustrating an example technique of managing the migration of virtual machines.

FIG. 10 is a flow diagram illustrating an example technique of managing the migration of virtual machines. The technique 1000 can be performed by one or more data processing apparatus. For example, a VM registry service (e.g., the VM registry service 118 of FIG. 1) can be used to perform the technique 1000.

The VM registry service identifies 1002 that a virtual machine has migrated to a second, different data processing apparatus. For example, a communication process executing on the second data processing apparatus can notify the VM registry service that the virtual machine has been migrated.

The VM registry service associates 1004 the network address of the virtual machine with the network address of the second data processing apparatus. The VM registry service can also delete an association of the network address of the virtual machine with the network address of the host system on which it was previously executing.

The VM registry service invalidates 1006 any previously sent network address information for the virtual machine. The VM registry service can determine whether any virtual network pairs are currently established with the virtual machine and send a message invalidating those networks. For example, the VM registry service can determine whether any virtual network pairs have validity periods that are not yet expired, and send a message to the corresponding communication process to invalidate the network by deleting the network address information. Alternatively or in addition to invalidating the network address information, a forwarding process can be established on the prior host machine to forward any received packets to the new host machine for the virtual machine.

Figure 11:
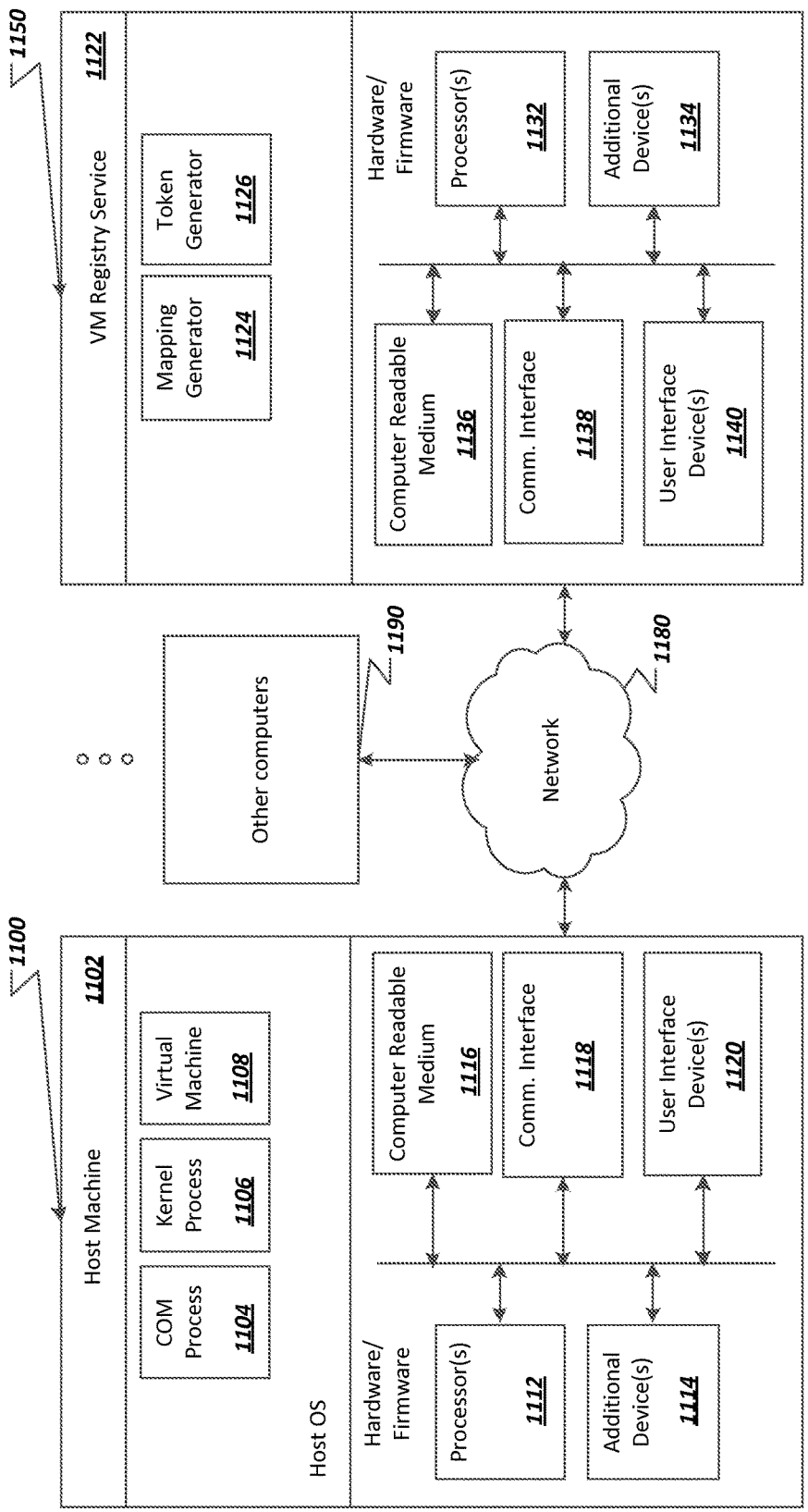
FIG. 11 is a schematic diagram of an example host machine and an example VM registry service.

FIG. 11 is a schematic diagram of an example host machine 1100 and an example VM registry service 1150. The host machine 1100 generally consists of a data processing apparatus 1102. The data processing apparatus 1102 can optionally communicate with the VM registry service 1150 and one or more other computers 1190 through a network 1180. While the host machine consists of only one data processing apparatus 1102 as shown in FIG. 11, multiple data processing apparatus can be used in one or more locations. The data processing apparatus 1102 includes various modules, e.g. executable software programs. One of the modules is the kernel 1106 of a host operating system (e.g., host operating system 106). A communication process module 1104 (e.g., communication process 106c) is configured to establish VNPs, encapsulate packets and to de-encapsulate packets. A virtual machine module 1108 (e.g., virtual machine 110) includes a representation of virtual hardware (e.g., virtual hardware 110a), a guest operating system (e.g., guest operating system 110b), and guest applications (guest applications 110c). Although several software modules are illustrated, there may be fewer or more software modules. Moreover, the software modules can be distributed on one or more data processing apparatus connected by one or more networks or other suitable communication mediums.

The data processing apparatus 1102 also includes hardware or firmware devices including one or more processors 1112, one or more additional devices 1114, a computer readable medium 1116, a communication interface 1118, and optionally one or more user interface devices 1120. Each processor 1112 is capable of processing instructions for execution within the data processing apparatus 1102. In some implementations, the processor 1112 is a single or multi-threaded processor. Each processor 1112 is capable of processing instructions stored on the computer readable medium 1116 or on a storage device such as one of the additional devices 1114. The data processing apparatus 1102 uses its communication interface 1118 to communicate with a VM registry service 1150 or one or more computers 1190, for example, over a network 1180. Examples of user interface devices 1120 include a display, a camera, a speaker, a microphone, a tactile feedback device, a keyboard, and a mouse. The data processing apparatus 1102 can store instructions that implement operations associated with the modules described above, for example, on the computer readable medium 1116 or one or more additional devices 1114, for example, one or more of a floppy disk device, a hard disk device, an optical disk device, or a tape device.

The VM registry service 1150 generally consists of a data processing apparatus 1122. The data processing apparatus 1122 can optionally communicate with the host machine 1100 and one or more other computers 1190 through a network 1180. While only one data processing apparatus 1122 is shown in FIG. 11, multiple data processing apparatus can be used in one or more locations. The data processing apparatus 1122 includes various modules, e.g. executable software programs. One of the modules is a mapping generation module 1124 configured to associate network address of VMs with network address information of their host machines. A token generation module 1126 is configured to generate tokens for particular VNPs. Although several software modules are illustrated, there may be fewer or more software modules. Moreover, the software modules can be distributed on one or more data processing apparatus connected by one or more networks or other suitable communication mediums.

The data processing apparatus 1122 also includes hardware or firmware devices including one or more processors 1132, one or more additional devices 1134, a computer readable medium 1136, a communication interface 1138, and optionally one or more user interface devices 1140. Each processor 1132 is capable of processing instructions for execution within the data processing apparatus 1122. In some implementations, the processor 1132 is a single or multi-threaded processor. Each processor 1132 is capable of processing instructions stored on the computer readable medium 1136 or on a storage device such as one of the additional devices 1134. The data processing apparatus 1122 uses its communication interface 1138 to communicate with a host machine 1100 or one or more computers 1190, for example, over a network 1180. Examples of user interface devices 1140 include a display, a camera, a speaker, a microphone, a tactile feedback device, a keyboard, and a mouse. The data processing apparatus 1122 can store instructions that implement operations associated with the modules described above, for example, on the computer readable medium 1136 or one or more additional devices 1134, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:

maintaining, by a virtual machine registry service, a distinct secret key for each of a plurality of virtual machines executing on a plurality of host machines, wherein the secret key for each of the virtual machines (i) is known to a communication process that executes on the same host machine as the virtual machine and that manages network communication for the virtual machine, (ii) is not known to any of the plurality of virtual machines, and (iii) is used by the virtual machine registry service to authorize pairwise communications between the virtual machine and other virtual machines of the plurality of virtual machines;

maintaining, by the virtual machine registry service, data identifying pairs of virtual machines that are allowed to communicate with one another;

receiving, by the virtual machine registry service, a plurality of requests, each request being received from a respective source communication process that manages network communication for a respective source virtual machine, and each request being a request for a token that authenticates the respective source virtual machine as being authorized to communicate with a respective destination virtual machine to a respective destination communication process that manages network communication for the respective destination virtual machine;

for each request of the plurality of requests:
determining, by the virtual machine registry service, that the respective source virtual machine is authorized to communicate with the respective destination virtual machine by consulting the data identifying pairs of virtual machines that are allowed to communicate with one another;

determining, by the virtual machine registry service, a host machine network address for the respective destination virtual machine;

generating, by the virtual machine registry service, a token based at least partly on the host machine network address and the secret key of the respective destination virtual machine; and sending, by the virtual machine registry service, the selected host machine network address and generated token to the respective source communication process for the respective source virtual machine for transmission to the respective destination communication process as evidence that the respective source virtual machine is authorized to communicate with the respective destination virtual machine.

2. The method of claim 1, wherein the respective source communication process that manages network communication for each source virtual machine executes in a user process space of a host operating system executing on the same host machine as the source virtual machine.

3. The method of claim 1, wherein the selected host machine network address comprises an Internet Protocol (IP) address of a respective host machine on which the respective destination virtual machine executes and a User Datagram Protocol (UDP) port for the respective destination virtual machine.

4. The method of claim 1, further comprising generating the token by creating a hash-based message authentication code from the host machine network address and the secret key of the respective destination virtual machine.

5. The method of claim 1, further comprising generating the token based at least in part on a network address of the respective source virtual machine.

6. The method of claim 1, further comprising sending data identifying a validity period for the generated token to the respective source communication process.

7. The method of claim 6, further comprising generating the token based at least in part on the validity period.

8. The method of claim 1, further comprising identifying that the respective destination virtual machine has migrated to a different host machine.

9. The method of claim 8, further comprising:
associating the virtual machine network address of the respective destination virtual machine with the host machine network address of the different host machine.

10. The method of claim 8, further comprising:
sending a message to the respective source communication process invalidating the previously sent host machine network address.

11. A system comprising:
one or more computers and one or more storage devices storing instructions that when executed by the one or more computers cause the one or more computers to perform operations comprising:
maintaining, by a virtual machine registry service, a distinct secret key for each of a plurality of virtual machines executing on a plurality of host machines, wherein the secret key for each of the virtual machines (i) is known to a communication process that executes on the same host machine as the virtual machine and that manages network communication for the virtual machine, (ii) is not known to any of the plurality of virtual machines, and (iii) is used by the virtual machine registry service to authorize pairwise communications between the virtual machine and other virtual machines of the plurality of virtual machines;
maintaining, by the virtual machine registry service, data identifying pairs of virtual machines that are allowed to communicate with one another;

receiving, by the virtual machine registry service, a plurality of requests, each request being received from a respective source communication process that manages network communication for a respective source virtual machine, and each request being a request for a token that authenticates the respective source virtual machine as being authorized to communicate with a respective destination virtual machine to a respective destination communication process that manages network communication for the respective destination virtual machine;

for each request of the plurality of requests:
determining, by the virtual machine registry service, that the respective source virtual machine is authorized to communicate with the respective destination virtual machine by consulting the data identifying pairs of virtual machines that are allowed to communicate with one another;

determining, by the virtual machine registry service, a host machine network address for the respective destination virtual machine;

generating, by the virtual machine registry service, a token based at least partly on the host machine network address and the secret key of the respective destination virtual machine; and sending, by the virtual machine registry service, the selected host machine network address and generated token to the respective source communication process for the respective source virtual machine for transmission to the respective destination communication process as evidence that the respective source virtual machine is authorized to communicate with the respective destination virtual machine.

12. The system of claim 11, wherein the respective source communication process that manages network communication for each source virtual machine executes in a user process space of a host operating system executing on the same host machine as the source virtual machine.

13. The system of claim 11, wherein the selected host machine network address comprises an Internet Protocol (IP) address of a respective host machine on which the respective destination virtual machine executes and a User Datagram Protocol (UDP) port for the respective destination virtual machine.

14. The system of claim 11, the operations further comprising generating the token by creating a hash-based message authentication code from the host machine network address and the secret key of the respective destination virtual machine.

15. The system of claim 11, the operations further comprising generating the token based at least in part on a network address of the respective source virtual machine.

16. The system of claim 11, the operations further comprising:
sending data identifying a validity period the generated token to the respective source communication process.

17. The system of claim 16, the operations further comprising generating the token based at least in part on the validity period.

18. The system of claim 11, the operations further comprising:
identifying that the respective destination virtual machine has migrated to a different host machine.

19. The system of claim 18, the operations further comprising:
associating the virtual machine network address of the respective destination virtual machine with the host machine network address of the different host machine.

20. The system of claim 18, the operations further comprising:
  sending a message to the respective source communication process invalidating the previously sent host machine network address.

21. A non-transitory computer storage medium encoded with a computer program, the program comprising instructions that when executed by data processing apparatus cause the data processing apparatus to perform operations comprising:
  one or more computers and one or more storage devices storing instructions that when executed by the one or more computers cause the one or more computers to perform operations comprising:
  maintaining, by a virtual machine registry service, a distinct secret key for each of a plurality of virtual machines executing on a plurality of host machines, wherein the secret key for each of the virtual machines (i) is known to a communication process that executes on the same host machine as the virtual machine and that manages network communication for the virtual machine, (ii) is not known to any of the plurality of virtual machines, and (iii) is used by the virtual machine registry service to authorize pairwise communications between the virtual machine and other virtual machines of the plurality of virtual machines;
  maintaining, by the virtual machine registry service, data identifying pairs of virtual machines that are allowed to communicate with one another;
  receiving, by the virtual machine registry service, a plurality of requests, each request being received from a respective source communication process that manages network communication for a respective source virtual machine, and each request being a request for a token that authenticates the respective source virtual machine as being authorized to communicate with a respective destination virtual machine to a respective destination communication process that manages network communication for the respective destination virtual machine;
  for each request of the plurality of requests:
    determining, by the virtual machine registry service, that the respective source virtual machine is authorized to communicate with the respective destination virtual machine by consulting the data identifying pairs of virtual machines that are allowed to communicate with one another;
    determining, by the virtual machine registry service, a host machine network address for the respective destination virtual machine;
    generating, by the virtual machine registry service, a token based at least partly on the host machine network address and the secret key of the respective destination virtual machine; and
    sending, by the virtual machine registry service, the selected host machine network address and generated token to the respective source communication process for the respective source virtual machine for transmission to the respective destination communication process as evidence that the respective source virtual machine is authorized to communicate with the respective destination virtual machine.

22. The computer storage medium of claim 21, wherein the respective source communication process that manages network communication for each source virtual machine executes in a user process space of a host operating system executing on the same host machine as the source virtual machine.

23. The computer storage medium of claim 21, wherein the selected host machine network address comprises an Internet Protocol (IP) address of a respective host machine on which the respective destination virtual machine executes and a User Datagram Protocol (UDP) port for the respective destination virtual machine.

24. The computer storage medium of claim 21, the operations further comprising generating the token by creating a hash-based message authentication code from the host machine network address and the secret key of the respective destination virtual machine.

25. The computer storage medium of claim 21, the operations further comprising generating the token based at least in part on a network address of the respective source virtual machine.

26. The computer storage medium of claim 21, the operations further comprising:
  sending data identifying a validity period for the generated token to the respective source communication process.

27. The computer storage medium of claim 26, the operations further comprising generating the token based at least in part on the validity period.

28. The computer storage medium of claim 21, the operations further comprising:
  identifying that the respective destination virtual machine has migrated to a different host machine.

29. The computer storage medium of claim 28, the operations further comprising:
  associating the virtual machine network address of the respective destination virtual machine with the host machine network address of the different host machine.

30. The computer storage medium of claim 28, the operations further comprising:
  sending a message to the respective source communication process invalidating the previously sent host machine network address.

* * * * *